US008970160B2

(12) United States Patent
Groves et al.

(10) Patent No.: US 8,970,160 B2
(45) Date of Patent: Mar. 3, 2015

(54) SUPERVISORY SYSTEM CONTROLLER FOR USE WITH A RENEWABLE ENERGY POWERED RADIO TELECOMMUNICATIONS SITE

(75) Inventors: Thomas Paul Groves, Newbury Berkshire (GB); Peter William Dale Bishop, Purton (GB)

(73) Assignee: PowerOasis, Ltd., Bath (GB)

( * ) Notice: Subject to any disclaimer, the term of this patent is extended or adjusted under 35 U.S.C. 154(b) by 491 days.

(21) Appl. No.: 12/950,741

(22) Filed: Nov. 19, 2010

(65) Prior Publication Data

US 2011/0125336 A1 May 26, 2011

(30) Foreign Application Priority Data

May 21, 2008 (GB) .................................. 0809235.5
May 20, 2009 (WO) ................ PCT/GB2009/050543

(51) Int. Cl.
*H02J 7/00* (2006.01)
*H02J 7/35* (2006.01)
(Continued)

(52) U.S. Cl.
CPC . *H02J 7/35* (2013.01); *F03D 9/002* (2013.01); *H01L 31/0583* (2013.01); *H02J 3/14* (2013.01); *H02J 7/34* (2013.01); *H02J 13/0062* (2013.01); *H02J 7/0088* (2013.01); *Y02E 10/725* (2013.01); *Y02E 10/766* (2013.01); *Y04S 10/123* (2013.01); *H02J 3/383* (2013.01); *H02J 3/386* (2013.01);
(Continued)

(58) Field of Classification Search
USPC ......................................................... 320/101
See application file for complete search history.

(56) References Cited

U.S. PATENT DOCUMENTS 4,636,931 A    1/1987   Takahashi et al.
4,742,291 A    5/1988   Bobier et al.
(Continued)

FOREIGN PATENT DOCUMENTS

EP    1 801 950    6/2007
EP    1 813 807    8/2007
(Continued)

OTHER PUBLICATIONS

"Control Stabilisation of an Islanded System with DFIG Wind Turbine" M. Aktarujjaman, Student Member, IEEE, M.A. Kashem, Sernior Member, IEEE, M. Negnevitsky, Member, IEEE, and G. Ledwich, Senior member, IEEE, 6 pages, date unknown.
(Continued)

*Primary Examiner* — Drew A Dunn
*Assistant Examiner* — Robert Grant
(74) *Attorney, Agent, or Firm* — Weide & Miller, Ltd.

(57) ABSTRACT

A supervisory system controller for controlling and monitoring the generation of electrical energy from renewable sources and management methods for the storage of energy so generated and interconnecting the energy-generating elements, storage and load. The supervisory system controller operates to maximum the power transfer from a wind turbine to a battery by automatically varying the threshold levels at which turbine dump loads are switched based on system inputs and measurements. The method conserves generator fuel by delaying a scheduled generator maintenance running period such that it occurs when renewable energy availability is predicted to be low and battery is in a reduced state of charge. Further modifications and management methods are also provided.

18 Claims, 1 Drawing Sheet

(51) Int. Cl.
- *F03D 9/00* (2006.01)
- *H02S 10/10* (2014.01)
- *H02J 3/14* (2006.01)
- *H02J 7/34* (2006.01)
- *H02J 13/00* (2006.01)
- *H02J 3/38* (2006.01)

(52) U.S. Cl.
CPC .............. *Y02E 10/563* (2013.01); *Y02E 10/566* (2013.01); *Y02E 10/763* (2013.01); *Y02E 40/72* (2013.01)
USPC ........................................................ 320/101

(56) References Cited

U.S. PATENT DOCUMENTS

| | | | |
|---|---|---|---|
| 5,349,535 A | | 9/1994 | Gupta |
| 5,689,398 A | | 11/1997 | Miller et al. |
| 6,560,131 B1 | | 5/2003 | vonBrethorst |
| 7,020,436 B2 | * | 3/2006 | Schmutz ........................... 455/9 |
| 7,119,459 B2 | * | 10/2006 | Bruwer et al. ................. 307/140 |
| 2001/0023703 A1 | | 9/2001 | Kondo et al. |
| 2003/0047209 A1 | * | 3/2003 | Yanai et al. ................... 136/291 |
| 2003/0111103 A1 | | 6/2003 | Bower et al. |
| 2004/0117330 A1 | | 6/2004 | Ehlers et al. |
| 2004/0232878 A1 | | 11/2004 | Couch et al. |
| 2005/0225090 A1 | | 10/2005 | Wobben |
| 2006/0097519 A1 | | 5/2006 | Steinke |
| 2006/0103137 A1 | | 5/2006 | Wobben |
| 2006/0158037 A1 | | 7/2006 | Danley et al. |
| 2006/0214428 A1 | | 9/2006 | Altemark et al. |
| 2007/0013194 A1 | | 1/2007 | Calley |
| 2007/0013340 A1 | | 1/2007 | Mattichak |
| 2007/0120538 A1 | | 5/2007 | Sato |
| 2007/0200434 A1 | * | 8/2007 | Gottlieb et al. .................. 307/66 |
| 2007/0246943 A1 | | 10/2007 | Chang et al. |
| 2007/0252716 A1 | | 11/2007 | Burger |
| 2008/0307243 A1 | * | 12/2008 | Lee ............................... 713/320 |
| 2009/0079161 A1 | * | 3/2009 | Muchow et al. ............... 320/101 |
| 2010/0207585 A1 | * | 8/2010 | Duvalsaint et al. ........... 320/136 |

FOREIGN PATENT DOCUMENTS

| | | |
|---|---|---|
| GB | 2 417 378 | 2/2006 |
| GB | 2 444 297 | 6/2008 |
| WO | WO 96/38896 | 12/1996 |
| WO | WO 00/31598 | 6/2000 |
| WO | WO 02/086649 | 10/2002 |
| WO | WO 02/103879 | 12/2002 |
| WO | WO 2005/019870 | 3/2005 |
| WO | WO 2007/148299 | 12/2007 |
| WO | WO 2008/002226 | 1/2008 |

OTHER PUBLICATIONS

Elsevier, Renewable Energy 31 (2006) 2122-2139, "Component sizing for an autonomous wind-drivin desalination plant" Panagiotis A. Koklas, Stavros A. Papathanassiou, School of Electrical and Computer Engineering National Technical University of Athens (NTUA), © 2005, Elsevier Ltd., www.elsevier.com/locate/renene, Nov. 2, 2005, 18 pages.

* cited by examiner

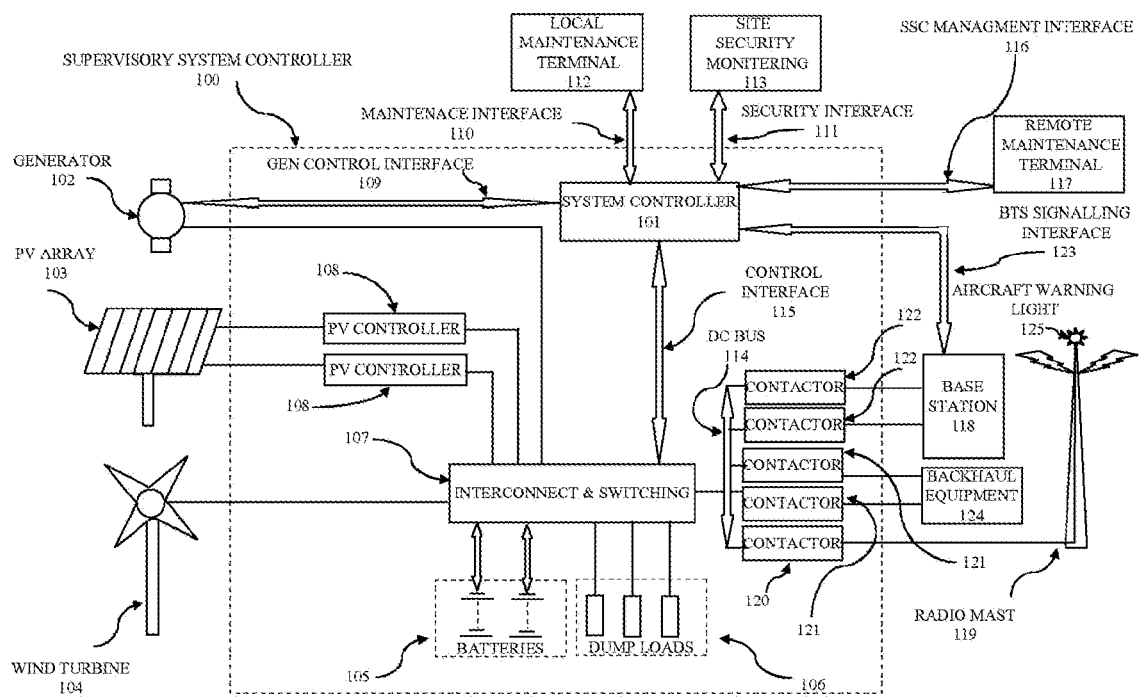

SUPERVISORY SYSTEM CONTROLLER FOR USE WITH A RENEWABLE ENERGY POWERED RADIO TELECOMMUNICATIONS SITE

PRIORITY CLAIM

This application is a continuation of and claims priority under 35 U.S.C. §120 and/or 35 U.S.C. §365 to co-pending PCT Application No. PCT/GB2009/050543 having an international filing date of May 20, 2009, which claims priority to Great Britain Application No. 0809235.5 filed on May 21, 2008.

FIELD OF THE INVENTION

The present invention relates to a Supervisory System Controller (SSC) for controlling and monitoring the generation of electrical energy from renewable sources, managing the storage of energy so generated and interconnecting the energy generating elements, storage and load.

RELATED ART

One type of radio communications system is a cellular communications system. In a cellular communications system, the area over which service is provided is divided into a number of smaller areas called cells. Typically each cell is served from a base transceiver station (BTS) which has a corresponding antenna or antennas for transmission to and reception from a user station, normally a mobile station and a backhaul connection for routing of communications to a fixed switching centre for onward transmission to fixed user terminals or other communications networks. Presently established cellular radio communications systems include Global System for Mobile communications (GSM), Code Division Multiple Access (CDMA), Worldwide Interoperability for Microwave Access (WiMAX), and also the Universal Mobile Telecommunication System (UMTS).

Such base transceiver stations and their associated equipment require electrical power to operate. Typically this power has been provided by connection to an electrical grid, or in cases where this is not available connection to a standalone diesel generator. More recently power generated from renewable means such as wind turbines or photovoltaic (PV) arrays has been used as an alternative to diesel generators for sites without a grid connection.

While this offers considerably advantages in operational costs over a diesel generator their performance is very dependant on the prevailing weather conditions and significant energy storage is required to provide a reserve for periods of low renewable energy generation. The disadvantage with these systems is that in order to provide the high level of power availability required for reliable operation of a radio communications system the size of both the generation equipment and the storage capacity has to be considerably increased over that of a system that is not required to provide continuous power.

Renewable energy generators such as wind turbines and PV arrays require electronic control systems to regulate their performance and to ensure that batteries used for energy storage are charged according to the correct profile for the size, type of cell technology employed in the battery, and environmental factors such as temperature. Whilst PV controllers exist that perform this function, when a wind turbine and PV system are combined together the usual mode of operation is for the turbine controller to err on the side of under charging the batteries as its control is based on fixed voltage level thresholds that do not take account of battery condition or temperature. When these thresholds are exceeded, dump loads are switched in to dissipate excess energy and to prevent damage occurring to the battery by charging it with too high a current. The use of fixed thresholds for controlling dump loads is wasteful of energy and can lead to the over sizing of both turbines and battery systems to compensate.

In a system described above it is normal to provide a means of preventing the batteries from becoming deeply discharged or to prevent discharge below a certain defined state of charge to extend the batteries operating life. This is provided by a low voltage disconnect device that will remove all loads from the batteries when the batteries terminal voltage drops below a preset voltage threshold. Hysteresis is provided in the detection circuitry to prevent the loads reconnecting again until the battery is being recharged. This hysteresis is also of a preset, fixed value. The use of fixed thresholds for the control and switching of loads offers none of the flexibility required to permit the most efficient implementation of a renewable energy powered telecommunications system.

Present control systems do not permit the automatic, selective operation of disconnect devices to remove loads of a specific type for the purpose of prolonging the operation of a higher priority load, thereby permitting the use smaller batteries. Neither do existing systems permit an operator to remotely command a disconnect device to remain connected, to override a low voltage disconnect, and provide additional reserves of power under exceptional circumstances should it be required.

Existing systems have no means of receiving predicted weather data or correlating such weather data with the local micro climate to predict the availability and quantity of renewable energy at the site. Neither do they accurately determine the state of charge of batteries and use this data together with the energy prediction data to control the loads within the system, either by variable power control or by means of selective disconnection and reconnection. Existing systems do not permit communications between the telecommunications equipment and the system controller for the purpose of power control or the passing of data, monitoring and alarm information.

Due to the failings mentioned above it is also not possible to obtain the most efficient use of a fossil fuelled backup generator, both in fuel usage and service maintenance intervals.

Existing systems do not offer dual or N+1 redundancy of critical components in the renewable energy components, for example splitting individual PV panels between multiple PV controllers for the purpose of failure tolerance. Neither are critical components that ensure reliability of supply to the telecommunications equipment duplicated to ensure the highest levels of reliability. Although multiple strings of batteries are occasionally used in such systems they are not configured to permit the automatic removal and testing of an individual battery string or the automatic removal of a battery string that has developed a fault.

SUMMARY

The present invention addresses some or all of the above disadvantages.

According to one aspect of the present invention, there is provided an apparatus for controlling and monitoring the generation of electrical energy from renewable sources, managing the storage of energy so generated and interconnecting the energy generating elements, storage and load.

According to another aspect of the present invention, there is provided a method of receiving weather forecast data and using said data to predict renewable energy availability at a site for the purpose of connecting, disconnecting or controlling the power consumption of loads connected to a battery.

According to another aspect of the present invention, there is provided a method of more efficiently controlling a fossil fuelled backup generator by overriding or delaying the operation of said fossil fuelled generator to recharge a battery if predicted weather data indicates that renewable energy will become available within an acceptable timeframe.

According to another aspect of the present invention, there is provided a method to conserve generator fuel and extend generator servicing intervals by delaying a scheduled generator maintenance running period, that may be required to preserve generator condition and starting capability, such that it occurs when weather data is predicting low renewable energy availability and a battery is in a reduced state of charge.

According to another aspect of the present invention, there is provided a plurality of independent disconnection devices that are controlled by an algorithm that uses voltage levels, battery charge status, a real time clock, predicted renewable energy availability and operator remote commands to control said devices.

According to another aspect of the present invention, there is provided a control system that can dynamically vary the disconnection thresholds of one or more disconnect devices to remove power load from a DC bus to make available a greater proportion of energy to one or more specific loads that may remain connected. This may specifically include the disconnection of a base station to make available a greater proportion of battery energy to backhaul communications equipment.

Further aspects of the invention are as claimed in the dependent claims. Additional specific advantages are apparent from the following description and figures which relate to a merely exemplary embodiment of the present invention.

The present invention is applicable to, but not limited to, radio communication systems such as the Global System for Mobile communications (GSM), Code Division Multiple Access (CDMA), Worldwide Interoperability for Microwave Access (WiMAX), and also the Universal Mobile Telecommunication System (UMTS).

According to another aspect of the present invention, there is provided an apparatus for controlling and monitoring the generation of electrical energy from renewable sources, which operates to maximise the power transfer from a wind turbine to a battery by automatically varying the threshold levels at which turbine dump loads are switched based upon system inputs and measurements.

According to another aspect of the present invention, there is provided an apparatus which varies the threshold levels at which turbine dump loads are switched according to the precise state of charge of the battery and the usage pattern of the battery preceding the charge period.

According to another aspect of the present invention, there is provided an apparatus for controlling and monitoring the generation of electrical energy from renewable sources that can communicate with a remote device to obtain weather forecast data for the purpose of predicting future renewable energy generation capability.

According to another aspect of the present invention, there is provided an apparatus which correlates local micro climate conditions with forecasted weather data for the purpose of predicting future energy availability.

According to another aspect of the present invention, there is provided an apparatus that uses predicted renewable energy availability for the purpose of connecting, disconnecting or controlling the power consumption of loads connected to a battery.

According to another aspect of the present invention, there is provided an apparatus that can override or delay the operation of a fossil fuelled generator to recharge a battery if predicted energy data indicates that renewable energy will become available within an acceptable timeframe.

According to another aspect of the present invention, there is provided a method to conserve generator fuel and extend generator servicing intervals by delaying a scheduled generator maintenance running period, that may be required to preserve generator condition and starting capability, such that it occurs when renewable energy availability is predicted to be low and a battery is in a reduced state of charge.

According to another aspect of the present invention, there is provided an apparatus for controlling and monitoring the generation of electrical energy from renewable sources that has plurality of disconnect devices to allow independent disconnection of individual loads from a DC bus according to an algorithm that uses voltage levels, battery state of charge, time and override command.

According to another aspect of the present invention, there is provided an apparatus that uses the measure of battery state of charge for the purpose of connecting, disconnecting or controlling the power consumption of loads connected to a battery.

According to another aspect of the present invention, there is provided an apparatus wherein one or more said disconnect devices can have their operating thresholds adjusted to remove power load from a DC bus to make available a greater proportion of energy to one or more specific loads that may remain connected.

According to another aspect of the present invention, there is provided an apparatus that that may dynamically vary the disconnection threshold of a disconnect device controlling a base station to make available a greater proportion of battery energy to backhaul communications equipment.

According to another aspect of the present invention, there is provided an apparatus that can be commanded to override the normal operation of battery protection disconnect devices to provide additional operational power under an emergency condition.

According to another aspect of the present invention, there is provided an apparatus that can communicate with telecommunications equipment to command said equipment to reduce its power consumption.

According to another aspect of the present invention, there is provided an apparatus whereby a communications system comprises two BTSs, one providing BCCH carriers and a second with additional capacity, that can exercise power control by disconnecting the second BTS.

According to another aspect of the present invention, there is provided an apparatus for controlling and monitoring the generation of electrical energy from renewable sources that has a plurality of PV arrays and individually switched and controlled PV controllers to offer redundancy of power supply in the event of a PV array or PV controller failure by disconnecting the failed device from the remainder of the functioning system and communicating the failure to the system controller.

According to another aspect of the present invention, there is provided an apparatus for controlling and monitoring the generation of electrical energy from renewable sources that has a plurality of contactor devices to offer redundancy of power connection in the event of a contactor or central controller failure.

According to another aspect of the present invention, there is provided an apparatus for controlling and monitoring the generation of electrical energy from renewable sources that has a plurality of batteries to offer redundancy of battery power in the event of a fault within an individual battery string.

According to another aspect of the present invention, there is provided an apparatus that has a plurality of batteries to permit automatic, periodic removal and capacity measurement of an individual battery string without interruption of normal operation.

According to another aspect of the present invention, there is provided an apparatus that has a plurality of batteries to permit battery replacement at the batteries end of life without affecting the normal operation of the communications equipment.

According to another aspect of the present invention, there is provided An apparatus for controlling and monitoring the generation of electrical energy from renewable sources that has redundant contactors to improve reliability for the switching of safety devices such as mast warning lights to assist in aircraft collision avoidance.

According to another aspect of the present invention, there is provided an apparatus that controls redundant contactors for the switching of safety devices, such as mast warning lights used to assist in aircraft collision avoidance, continue to receive power when other system loads have been disconnected.

According to another aspect of the present invention, there is provided an apparatus for controlling and monitoring the generation of electrical energy from renewable sources that has a plurality of individually switched and controlled wind turbines to offer redundancy of power supply in the event of a turbine failure by disconnecting the failed device from the remainder of the functioning system and communicating the failure to the system controller.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1 is an exemplary illustration of a radio communications site powered by renewable energy generated by a wind turbine and photovoltaic array, containing a supervisory system controller for monitoring and controlling the system according to an embodiment of the present invention.

DETAILED DESCRIPTION

The embodiment hereinafter described relates to a renewable energy powered storage system for powering radio communications systems.

In FIG. 1, the components contained in the dotted box represent a Supervisory System Controller 100. A software enabled system controller 101 has a control interface 115 for the control of interconnect and switching of externally housed batteries 105 and turbine dump loads 106. Control is also provided to switch mast warning light contactors 120 for the supply of power to aircraft warning lights 125 mounted on the radio mast 119, backhaul equipment contactors 121 for the supply of power to backhaul equipment 124, and Base Station contactors 122 for the supply of power to the Base Station 118 from a DC bus 114.

The system controller 101 also possesses a generator control interface 109 to permit the start and stop control of an optional generator 102 and also to receive status information from the generator if one is present. A maintenance interface 110 is provided to permit the connection of a local maintenance terminal 112 for the purpose of software upgrades, changing site control parameters and the monitoring of system performance data. A security interface 111 is provided for the connection of site security monitoring devices 113. The SSC management interface 116 provides connection to a remote maintenance terminal 117 for the provision of remote access to the controller for software upgrades, changing site control parameters and the monitoring of system performance data.

A BTS signaling interface 123 is provided to permit two-way signalling between the SSC and the base station 118 for the purpose of base station power control and the reporting of status and alarms.

The SSC 100 has provision for the connection of a PV array 103 via one or more PV controllers 108 and for the connection of a wind turbine 104 to the DC bus 114 via interconnect and switching 107.

Under normal operation the SSC 100 will manage the renewable energy power from the PV array 103 and wind turbine 104 to maintain power to the system loads of the base station 118, backhaul equipment 123, mast warning lights 119, and to charge the batteries 105. The PV controllers 108 control all aspects of battery charging from the PV array 103 to prevent over charge when surplus power is available from this source. When surplus power is available from the wind turbine 104 one or more of the dump loads 106 are switched on to dissipate the excess energy and prevent overcharge of the batteries 105 for the duration of the excess power being available. The voltage thresholds at which these loads are switched on and off are dynamically controlled based on the state of charge of the battery 105 to improve the capture of turbine power.

When insufficient power is available from renewable sources the system loads take their power from the batteries 105 which are sized to maintain normal operation for a specified period of time. When renewable power becomes available again the system will revert to normal operation as described above.

The system controller 101 can receive weather forecast data from the remote maintenance terminal 117 which it uses to efficiently manage the power system. In a system that does not have a generator 102, if renewable energy is not available and the forecast is not predicting renewable energy becoming available in the required timescale, the SSC can implement a number of power saving options to maximise the system's operating time. The SSC 100 can command the base station 118 to implement any power reduction features that it may possess such as turning off non-BCCH transceivers. The SSC 100 can also disconnect the base station 118 via the contactors 122 during off-peak times, such as at night, to conserve battery power for the periods of maximum demand. For remote sites carrying little or no night time traffic, a controlled nightly shut down can give considerable savings in required energy generation elements and battery capacity.

Another option available to conserve power is to configure two, lower power base stations onto one site in place of one larger capacity base station and configured so one base station provides the BCCH carriers and the second one peak hour capacity. The SSC 100 can then exercise power control by disconnecting the second base station from the battery at off-peak times or as remotely commanded by the operator.

Ultimately, if no renewable power becomes available, the system controller 101 will perform a low voltage disconnect, where it commands the contactors 120, 121 and 122 to disconnect their respective loads from the DC bus 114 to prevent the battery 105 from discharging to a level where it will sustain damage.

In a system that does have a generator 102, if renewable energy is not available and the forecast is not predicting energy becoming available in the required timescale, the SSC 100 can start the generator 102 and this will provide power to the system loads and also to charge the battery 105. Once the battery is charged, or renewable energy is forecast to become available in the required timescale, the SSC 100 will stop the generator 102 to conserve fuel. Similarly, if generator usage is low and a generator maintenance run is required to preserve generator condition and starting capability, the SSC 100 can automatically schedule this to occur at a time when the battery capacity is reduced and weather data is predicting low renewable energy availability. This ensures the energy produced during the generator maintenance run will be absorbed by the battery and is not wasted.

The SSC can also inhibit a low voltage disconnect and postpone a generator start for a short period of time if renewable energy is predicted to become available but after the normal low voltage disconnect point for the load. This offsets a generator start against occasionally running the battery to a slightly lower state of charge but conserves fuel and extends generator service intervals.

In some situations the backhaul equipment 124 links on to provide connection for routing of communications for other base station sites to a fixed switching centre for onward transmission to fixed user terminals or other communications networks (daisy chaining) In the event of the system controller 101 determining there insufficient power being available to operate the radio site continuously, it is desirable to provide a longer period of battery operation to this backhaul equipment than to the site base station 118. The SSC 100 can independently control how long each load will remain connected to the dc bus 114. By disconnecting the base station 118 after a predetermined time period the SSC 100 will reduce the power load on the battery and so extend the time backhaul equipment 124 can operate before the battery 105 becomes discharged to the point where a low voltage disconnect will occur. The SSC has the ability to vary the operating time of the base station 118 to increase or decrease the operating time of the backhaul equipment 124.

In the event of the energy sources sustaining damage, and power generation becoming limited or unavailable, an operator can remotely command the SSC 100 to disconnect base station 118 power immediately in the interest of maintaining communications in the remainder of his network for a much longer period. The SSC 100 also has the option to override one or more of the low voltage disconnects to power the base station and/or the backhaul equipment to provide additional operating time at the expense of potentially damaging the batteries by deep discharge. This feature would only be exercised in extreme conditions where the potential cost of replacement batteries is considered acceptable to meet the operational need, for example, in the event of a natural disaster where life may depend upon working communications.

High levels of reliability and availability are achieved by configuring the PV array 103 to be split between multiple PV controllers 108, such that a failure in one PV controller 108 will not remove all of the available solar power to the SSC 100. The SSC also employs dual redundant low voltage disconnect components, 121, 122, to ensure that a contactor failure will not remove a load from the battery. The battery 105, may also be configured as two or more strings of cells to permit automatic, periodic removal and capacity measurement of one battery string whilst the system continues to operate from the remaining battery string(s). The use of multiple battery strings also permits the removal of an individual battery string in the event of a fault within an individual cell whilst maintaining operation from the remaining battery string(s). Additionally it facilitates the replacement of the batteries at end of life without the need to take the site off air.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An apparatus for controlling and monitoring the generation of electrical energy from renewable sources, said apparatus being operable to manage storage of energy generated from renewable sources by controlling interconnection of energy generating elements, energy storage elements and energy load elements, said apparatus being operable to communicate with a remote device to obtain weather forecast data for the purpose of predicting future renewable energy generation capability; and manage storage of energy generated from said renewable sources based upon said prediction of future renewable energy generation capability, and said apparatus further comprising a plurality of disconnect devices to allow independent disconnection of individual loads from a DC bus according to an algorithm that uses voltage levels, battery state of charge, time and override command, to manage said storage of energy generated from said renewable sources.

2. An apparatus according to claim 1 which correlates local micro climate conditions with forecasted weather data for the purpose of predicting future energy availability.

3. An apparatus according to claim 1 that uses predicted renewable energy availability for the purpose of connecting, disconnecting or controlling the power consumption of loads connected to a battery.

4. An apparatus according to claim 1 that can override or delay the operation of a co-located diesel or gasoline powered generator to recharge a battery if predicted energy data indicates that renewable energy will become available within an acceptable timeframe.

5. An apparatus for controlling and monitoring the generation of electrical energy from renewable sources, said apparatus being operable to manage storage of energy generated from renewable sources by controlling interconnection of energy generating elements, energy storage elements and energy load elements, said apparatus comprising a plurality of disconnect devices to allow independent disconnection of individual loads from a DC bus according to an algorithm that uses voltage levels, battery state of charge, time and override command, to manage said storage of energy generated from said renewable sources, and wherein said apparatus is operable to use a measure of battery state of charge for the purpose of connecting, disconnecting or controlling the power consumption of loads connected to a battery.

6. An apparatus according to claim 5, wherein one or more said disconnect devices can have their operating thresholds adjusted to remove power load from a DC bus to make available a greater proportion of energy to one or more specific loads that may remain connected.

7. An apparatus according to claim 5 that may dynamically vary a disconnection threshold of a disconnect device controlling a base station to make available a greater proportion of battery energy to backhaul communications equipment.

8. An apparatus according to claim 5 that can be commanded to override a normal operation of battery protection disconnect devices to provide additional operational power under an emergency condition.

9. An apparatus according to claim 5 that can communicate with telecommunications equipment at a telecommunication site to command said equipment at the telecommunication site to reduce its power consumption to thereby reduce the load on the battery at the telecommunication site.

10. An apparatus according to claim 5 whereby a communications system comprises two base transceiver stations, one providing broadcast control channel carriers and a second with additional capacity, that can exercise power control by disconnecting the second base transceiver stations to thereby reduce the load on the battery.

11. An apparatus according to claim 1 that uses the measure of battery state of charge for the purpose of connecting, disconnecting or controlling the power consumption of loads connected to a battery.

12. An apparatus according to claim 1, wherein one or more said disconnect devices can have their operating thresholds adjusted to remove power load from a DC bus to make available a greater proportion of energy to one or more specific loads that may remain connected.

13. An apparatus according to claim 1 that may dynamically vary the disconnection threshold of a disconnect device controlling a base station to make available a greater proportion of battery energy to backhaul communications equipment.

14. An apparatus according to claim 1 that can be commanded to override the normal operation of battery protection disconnect devices to provide additional operational power under an emergency condition.

15. An apparatus according to claim 1 that can communicate with telecommunications equipment to command said equipment to reduce its power consumption.

16. An apparatus for controlling and monitoring generation of electrical energy from renewable sources, said apparatus being operable to manage storage of energy generated from renewable sources by controlling interconnection of energy generating elements, energy storage elements and energy load elements, said apparatus being operable to communicate with a remote device to obtain weather forecast data for the purpose of predicting future renewable energy generation capability; and manage storage of energy generated from said renewable sources based upon said prediction of future renewable energy generation capability, and operable to override or delay operation of a fossil fuelled generator to recharge a battery if predicted energy data indicates that renewable energy will become available within a predetermined acceptable timeframe, and said apparatus further comprising at least one DC bus interconnecting the fossil fuelled generator and the battery and to allow for disconnection of individual loads, and the predicted energy data includes weather forecast data and battery state of charge data which are processed according to an algorithm to thereby override or delay operation of a fossil fuelled generator.

17. An apparatus according to claim 16 which correlates local micro climate conditions with forecasted weather data for the purpose of predicting future energy availability.

18. An apparatus according to claim 16 that uses predicted renewable energy availability for the purpose of connecting, disconnecting or controlling the power consumption of loads connected to a battery.

\* \* \* \* \*